United States Patent [19]

Toofan

[11] Patent Number: 5,519,675
[45] Date of Patent: May 21, 1996

[54] POLARIZATION DETECTOR OPTICAL HEAD

[75] Inventor: Mehrdad Toofan, 2133 Cuesta Dr., Milpitas, Calif. 95035

[73] Assignee: Mehrdad Toofan, Milpitas, Calif.

[21] Appl. No.: 442,747

[22] Filed: May 17, 1995

[51] Int. Cl.$^6$ ........................................ G11B 7/00
[52] U.S. Cl. ........................ 369/13; 369/110; 369/116; 369/44.23
[58] Field of Search ........................ 369/13, 44.11, 369/44.14, 44.23, 44.26, 100, 112, 116, 110, 114, 54, 58, 44.38, 44.41; 360/59, 114

[56] References Cited

U.S. PATENT DOCUMENTS

| | | | |
|---|---|---|---|
| 4,409,631 | 10/1983 | Matsumoto | 369/110 X |
| 4,813,032 | 3/1989 | Koyama | 369/13 |
| 5,119,352 | 6/1992 | Bell | 369/13 |
| 5,124,868 | 6/1992 | Matsubayashi | 369/110 X |
| 5,337,300 | 8/1994 | Takishima et al. | 369/44.41 |
| 5,392,274 | 2/1995 | Sofue | 369/110 |
| 5,432,760 | 7/1995 | Yoshizawa et al. | 369/13 |

OTHER PUBLICATIONS

"Principles of Optics" By Max Born pp. 690 to 694.

*Primary Examiner*—Ali Neyzari

[57] ABSTRACT

An optical head comprising of a laser source, a collimating lens, a focusing lens, a beam splitter, two polarizers, a quarter wave retarder, three detector lenses, and three photo detectors can be used to detect the polarization change of reflected light from an optical memory. Linear polarized light emerging from the laser source is collimated by the collimating lens and then is focused through the beam splitter and focus lens on the optical memory. Reflected light, which is elliptically polarized upon reflection from optical memory, is subdivided by the beam splitter into three parts: The first part goes through the quarter wave phase retarder followed by a polarizer whose transmission axis is set at 45 degrees, to reach a photo detector through a detector lens. The second part goes through a second polarizer, which has its transmission axis also set at 45 degrees, and then through the second detector lens to reach another photo detector. The third part of light that emerges from beam splitter goes directly to the third detector lens to reach the last photo detector. A simple and elegant equation is derived which relates the three light intensities detected by the photo detectors to the change of phase between the orthogonal electrical components of reflected light from optical memory. Such information is sufficient to detect the recorded information on the optical memory.

8 Claims, 4 Drawing Sheets

POLARIZATION DETECTOR OPTICAL HEAD

FIELD OF THE INVENTION

This invention relates to an optical head used in an optical memory, and more particularly, to a method of reading recorded information on an optical memory based on a change of polarization of read-out light.

DESCRIPTION OF THE PRIOR ART

Optical storage disks are widely used in many applications, from consumer products to computer memories. In such memories, digital information is recorded in a form of a series of projections and depressions, namely lands and pits, on the surface of said memories. To reproduce the recorded information, an optical head which comprises a number of optical elements including a semiconductor laser is utilized. Light emitted from the laser is shined upon said memory and is reflected back from a reflective layer formed upon its pits and lands. By monitoring the change in the intensity of reflected light, one is capable of detecting and interpreting the recorded digital information.

The above scheme could be categorized as intensity modulation, wherein variation in the intensity level of reflected light carries the information. Consequently, signal to noise ratio plays a substantial role in designing and manufacturing precise optical head elements. Often, these elements have to be constructed in a very controlled environments. Such restricted requirements will increase the cost and reliability of the final product.

Another scheme, which is not yet widely popular, is phase modulation. In a phase reproducing strategy, the goal is to detect and map the change in polarization of reflected light from optical memory, to corresponding recorded digital information on said memory. Although this scheme has many advantages compared to an intensity modulation technique, optical head designed for such purposes as reported in many magneto-optical memories, basically operates in 2 limited modes of operation. That is, recorded binary information is detected based upon a binary change of polarization of reflected light: In the first case, if light is reflected back from the memory has the same polarization as the incident light it is interpreted as 1. In another case, if the reflected light has a different polarization, then it is interpreted as 0. Therefore, these optical heads are incapable of detecting changes in polarization which could be snapped to binary strings with a length more than one. Recorded densities of these optical memories is greatly restricted by the handicap of these kinds of optical heads in detecting and reproducing recorded data.

SUMMARY OF THE INVENTION

The principal object of the invention is to provide an optical head which utilizes changes in polarization of light reflected from an optical memory to reproduce recorded data.

Another object of the invention is to minimize and integrate the components needed to detect a change in polarization of light reflected from an optical memory, resulting in cost reduction and increased reliability of the optical head.

These objects are accomplished by utilizing two linear polarizers, and one quarter wave retarder. Reflected light is divided to three parts: one going through a polarizer, another through the quarter wave retarder followed by a polarizer, and the third directly to a photodetector. The ratio of detected intensities of above three beam of light, corresponds directly to the polarization of reflected light. This polarization may be mapped to recorded digital information on the memory via a table look-up or other techniques.

DETAILED DESCRIPTION OF THE INVENTION

Figure 1:
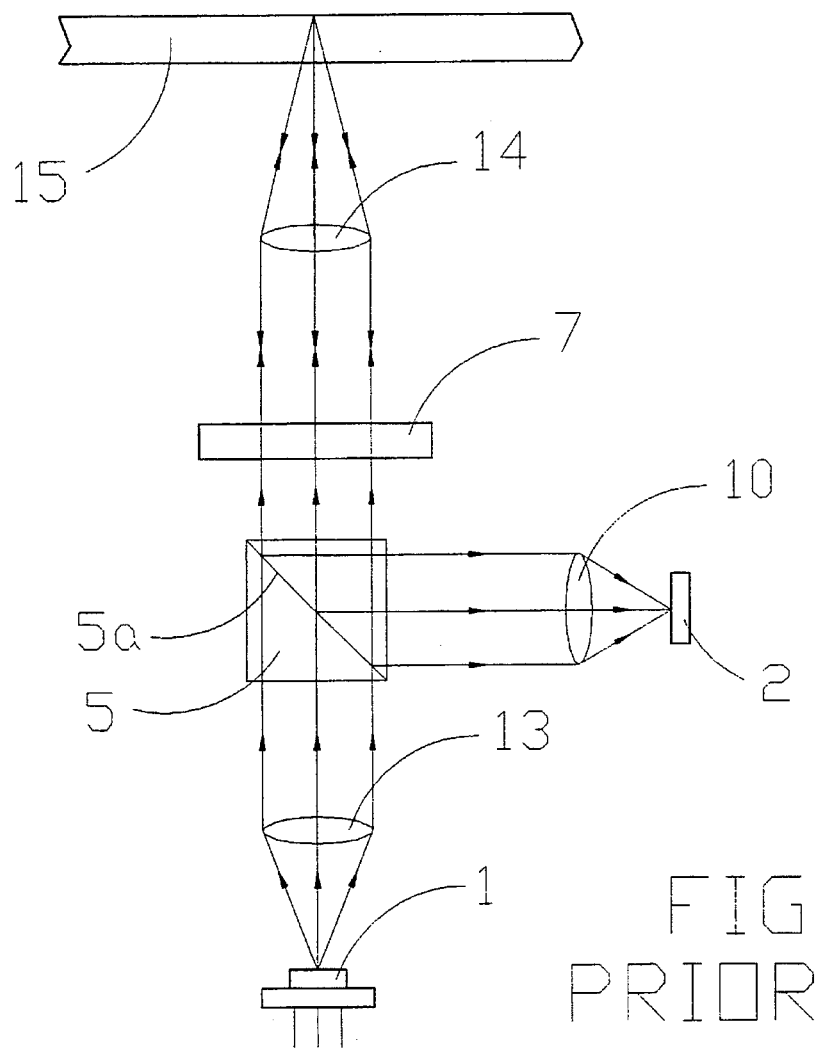
FIG. 1 shows the structure of an optical head for reading recorded digital information from an optical memory according to the prior art.

Referring to FIG. 1, shows the optical head according to the prior art. Read-out light, which is linearly polarized, emitted from the laser 1, is impinged upon a collimator lens 13. Consequently, a beam of light exits from the collimator 13, and passes directly through the polarized beam splitter 5 and then a quarter wave phase retarder 7 before reaching the focusing lens 14. The quarter wave retarder 7, which is aligned at 45 degrees with respect to the polarization axis of the incident light, converts the beam to a circularly polarized light which is then focused by the focusing lens 14 on the optical memory 15. According to the prior art, after reflection from the optical memory 15, the beam preserve its circularly polarized state, however with an opposite handness. Upon reflection from the memory, the light is passed through the focusing lens 14 and then through the quarter wave retarder 7 before reaching the beam splitter 5. The retarder 7, again, introduces another $\pi/2$ change in the polarization of the reflected light converting it back to a linear polarized light, yet with its optical axis orthogonal to the original incident light. The light is thus entirely reflected by the polarized beam splitter interface 5a toward detector lens 10 which focuses the light upon optical detector 2. The output of optical detector 2 is used to detect the recorded information on the optical memory 15.

It should be emphasized that use of these polarization elements in the light path, as is shown in FIG. 1, have nothing to do with detection of a change in the polarization state of the light. Rather, they are introduced in the optical head to deviate the reflected light from the source 1 and hence to reduce the optical feedback. Another neglected fact in the prior art is that light, reflected from the optical memory 15, retains its polarization state only for normal incident and varies for angles other than normal incident. With the presence of focusing lens 14, which usually has a large Numerical Aperture of about 0.5, the light is incident upon the optical memory 15 by ±30 degrees. Therefore, the light can not preserve its polarization upon reflection. Moreover, since optical memory 15 in practice contains birefringent materials, where the incident light travels through, the state of polarization of incident light can not be preserved even for normal incident.

Figure 2:
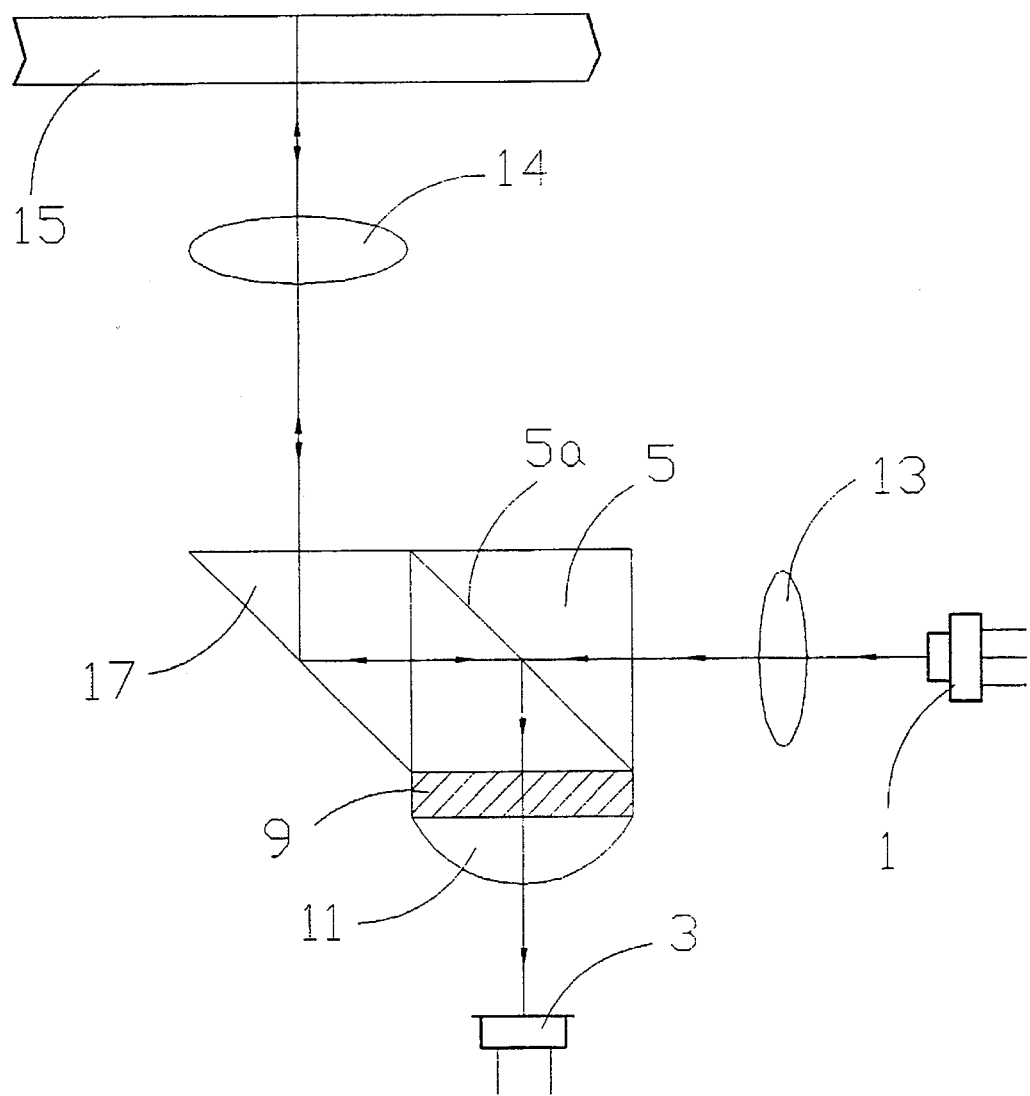
FIG. 2 shows the structure of an magneto optical head for reading recorded digital information from an optical memory according to the prior art.

FIG. 2 shows magneto optical head according to the prior art. In this scheme, the objective is to detect a small change in polarization of incident light created by the Kerr rotation due to magnetic layer on the optical memory 15. Referring to FIG. 2, p-polarized light is originated from the laser light 1 and is incident on the collimator lens 13. The output light of collimator lens 13 goes through the polarized beam splitter 5, and then is internally reflected by the beam-turning element 17 toward the focusing lens 14. The light is focused by the focusing lens on the optical memory 15 which reflects the light back. The reflected light passes through the focusing lens 14, which is then turned by the beam-turning element 17 toward the polarized beam splitter 5.

The polarized beam splitter 5 has been constructed such that the s-polarized reflection coefficient $R_s$ is at its optimum of 100% while the p-polarized reflection coefficient $R_p$ is set at about 10 to 30%. Thus, the small s-polarized component of reflected light, created by the Kerr effect, is completely reflected by the polarized beam splitter interface 5a along with a small fraction of p-polarized reflected light. The result is to magnify the effects of polarization. The reflected light from polarized beam splitter interface 5a is then incident on the polarizer 9 which passes the light through its transmission axis toward the detector lens 13. The intensity variation of the light on the optical detector 3 corresponds to the recorded magnetic information on the optical memory 15.

It should be noted that the intensity of the read-out beam is only useful in a binary mode of operation due to binary orientation of magnetic dipole moments of the magnetic layer of the optical memory. This concept, however, does not achieve a detection method for arbitrary change in the polarization of the original polarized light. Shot noise, and source fluctuation present another challenge for this conventional head. The proposed remedy has been to use a differential detection readout system using two detectors instead of one to eliminate common-mode noise sources. However, this technique could only increase the SNR by about 7 dB.

Present invention has the advantage of detecting any amount of polarization in the reflected light from the optical memory. Thus, information carried by optical memory can be reproduced by detecting a change in polarization. Reflected light from the optical memory, despite statements by the prior art, is generally elliptically polarized. To detect the amount of polarization for an elliptically polarized light, Born in "Principles of Optics" section 14.4 suggests two methods: In the first method, elliptically polarized light is passed through a quarter-wave plate and then through a Nicol prism which acts as a polarizer. These two optical elements are then independently rotated until no light is emerged from the analyzer. Retarder's axis angle and the polarizer's transmission axis angle are sufficient data for finding the orientation of the axes of the ellipse, and its ratio of major to minor axes. For the second method, suggested by Born, first a linearly polarized light is incident on a compensator which is located in front of a Nicol prism. The compensator is followed by a crossed analyzer with respect to Nicol prism. The location of the produced dark bands are marked as zero positions. The elliptically polarized light is then examined by the compensator followed by the analyzer alone. The displacement of the dark band from the zero positions determines the phase difference of the incident light.

The two methods are obviously not practical for detecting the phase difference of reflected light from an optical memory in an optical head. To detect the phase difference between the orthogonal electrical components of the reflected light consider a beam of perfectly polarized light characterized by four parameters $E_{x0}$, $E_{y0}$, $\delta_x$, and $\delta_y$. These are the corresponding electric field amplitudes, and phases along the x and y axis. After passing through a polarizer, whose transmission axis is set at angle $\alpha$ to the x axis, the emergent intensity could be obtained as follows: That is given:

$$E_x = E_{x0} \cos(\omega + \delta_x)$$

$$E_y = E_{y0} \cos(\omega + \delta_y)$$

After transmission through the polarizer, the emergent electric field is $$E_p = E_{p0} \cos(\omega + \delta_p).$$

But $$E_{p0} \cos(\omega t + \delta_p) = E_0 \cos(\omega t + \delta_x) \cos(\alpha) + E_{y0} \cos(\omega t + \delta_y) \sin(\delta) \quad (1)$$

or $$\cos(\omega t) E_{p0} \cos(\delta_p) = \cos(\omega t) (E_{x0} \cos(\delta_x) \cos(\delta) + E_{y0} \cos(\delta_y) \sin(\alpha)) \quad (2a)$$

$$\sin(\omega t) E_{p0} \sin(\delta_p) = \sin(\omega t) (E_{x0} \sin(\delta_x) \cos(\alpha) + E_{y0} \sin(\delta_y) \sin(\alpha)) \quad (2b)$$

Squaring the above 2 equations (2a, and 2b) and adding them up, one will find the emergent intensity from the polarizer as:

$$I = E_p^2 = E_{x0}^2 \cos^2(\alpha) + E_{y0}^2 \sin^2(\alpha) + E_{x0} E_{y0} \sin(2\alpha) \cos(\delta_x - \delta_y) \quad (3)$$

By choosing the transmission angle of the polarizer to be set at 45 degrees, and if one notes the notations of $\Delta\delta = (\delta_x - \delta_y)$, and $I_0 = E_{x0}^2 + E_{y0}^2$ then equation (3) could be written as:

$$I_1 = \tfrac{1}{2} I_0 + E_{x0} E_{y0} \cos(\Delta\delta) \quad (4)$$

Had it been the case that the incident light, before reaching the polarizer, first passed through a quarter wave retarder ($\Delta\phi = \rho/2$) with its axis parallel to the analyzer, then the emergent intensity, under the above assumptions, would have been:

$$I_1 = \tfrac{1}{2} I_0 + E_{x0} E_{y0} \sin(\Delta\delta) \quad (5)$$

Equations 4, and 5 could be rewritten as $$I_1 - \tfrac{1}{2} I_0 = \cos(\Delta\delta) \quad (6)$$

$$I_1 - \tfrac{1}{2} I_0 = \sin(\Delta\delta) \quad (7)$$

Dividing equation (7) by (6), one gets the final result as:

$$\tan(\Delta\delta) = (I_2 - \tfrac{1}{2} I_0)/(I_1 - \tfrac{1}{2} I_0) \quad (8)$$

Equation (8) reveals an elegant, yet simple relationship between the phase change of the incident light to the emergent intensities of the polarized light. Thus, one could readily calculate the phase change that the incident laser light goes through upon reflection from the optical memory using the equation (8). Moreover, the present invention which relies on equation (8), has the advantage of eliminating the laser source fluctuation noise since it is based on the ratio of intensities.

Figure 3:
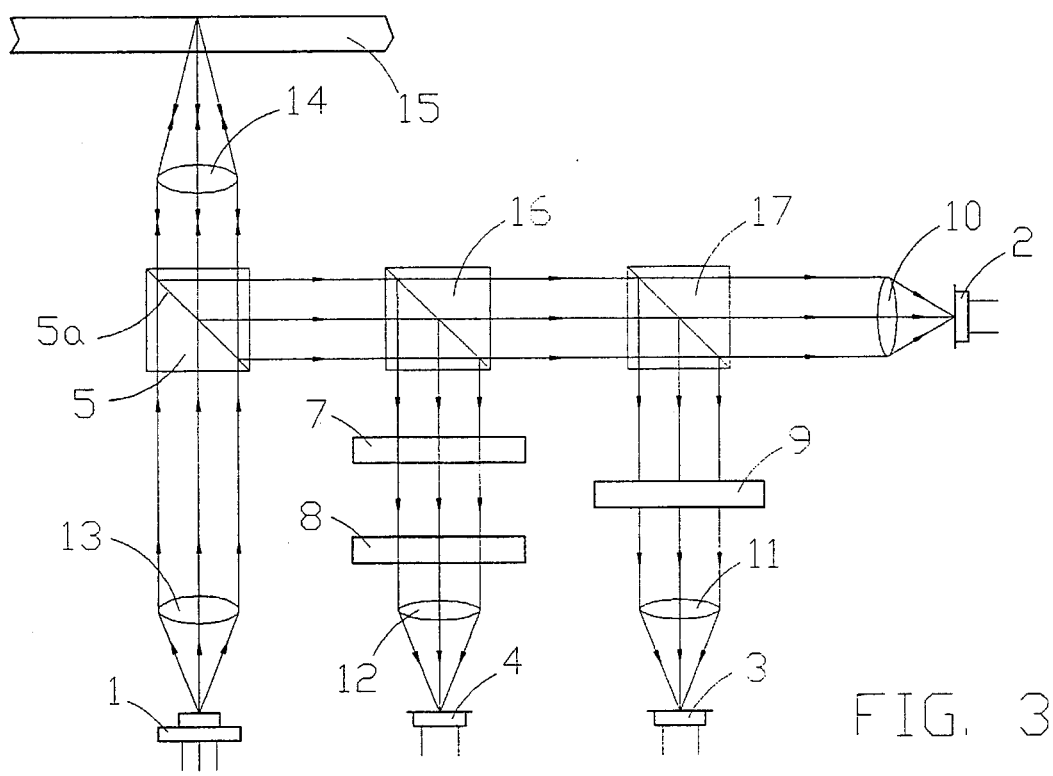
FIG. 3 shows the structure of an optical head for reading recorded digital information from an optical memory according to the invention.

FIG. 3 shows the optical head according to present invention. Referring to FIG. 3, polarized light that is emerging from the laser source 1, is incident upon collimator lens 13. A parallel beam of light exits the collimator lens 13 and passes through the beam splitter 5 to reach the focusing lens 14 which focuses the light onto the optical memory 15. Reflected light from the optical memory, which is generally elliptically polarized, passes again through focusing lens 14, and is reflected by the interface 5a. The beam of light is then divided into three paths by the two beam splitter 16 and 17. Note that beam splitters 5, 16, and 17 are cubical so that every ray of the light goes through exactly the same optical path. Instead of cubical beam splitters, one may also use half-mirrored plates which are set at 45 degrees with respect to the direction of light. Part of the light that is reflected from the beam splitter 16, goes through a quarter-wave phase retarder 7, and then through the polarizer 8, before reaching the detector lens 12. The axis of transmission of the polarizer is set at 45 degrees, and the retarder axis is parallel with it. Detector lens 12, then focuses the light onto the optical detector 4 for detecting intensity $I_2$. The other part of the light that goes through the beam splitter 16 is subdivided in two parts by the beam splitter 17. One part reaches directly the photo detector 2, which detects the intensity $I_0$, through the focusing detector lens 10. The other part of the reflected light from the beam splitter 17, goes through a polarizer 9 with its transmission axis set at 45 degrees to reach the detector lens 11. The detector lens 11 focuses the light on the photo detector 3 which detects the intensity $I_1$. Once again, to make sure that optical paths are the same for the three splitted light when they reach the three photo detectors 2, 3, and 4, care must be taken to use identical detector lenses 10, 11, and 12.

The intensities recorded by the three photo detectors 2, 3, and 4, namely $I_0$, $I_1$, and $I_2$, are related as per equation (8). Using equation (8), phase difference between orthogonal components of the electric field of the reflected light can be electronically calculated, by either a table look-up or by using an ASIC which uses Cordic algorithm.

Reflections from the beam splitters 5, 16, and 17, as well as passages through the detector lenses 10, 1 1, and 12 introduce additional phase changes in the final result. However, their total effect is an accumulative constant which can be subtracted from the final total phase difference calculation based on equation (8). It is also possible to remove the detector lenses in order to reduce the effects of unwanted polarization of the light introduced by the lenses, provided that the photo detector surface is wide enough to collect all the light which is intended to impinge on it.

It must be emphasized, once again, the importance of making sure that optical path taken by each ray, reflected from the optical memory, is the same before reaching the detectors 2, 3, and 4. Furthermore, if the beam splitters 16 and 17 are designed such that the division of light into three equal parts is not possible, then only a constant factor must be applied to each intensity $I_0$, $I_1$, and $I_2$ in equation (8).

Figure 4:
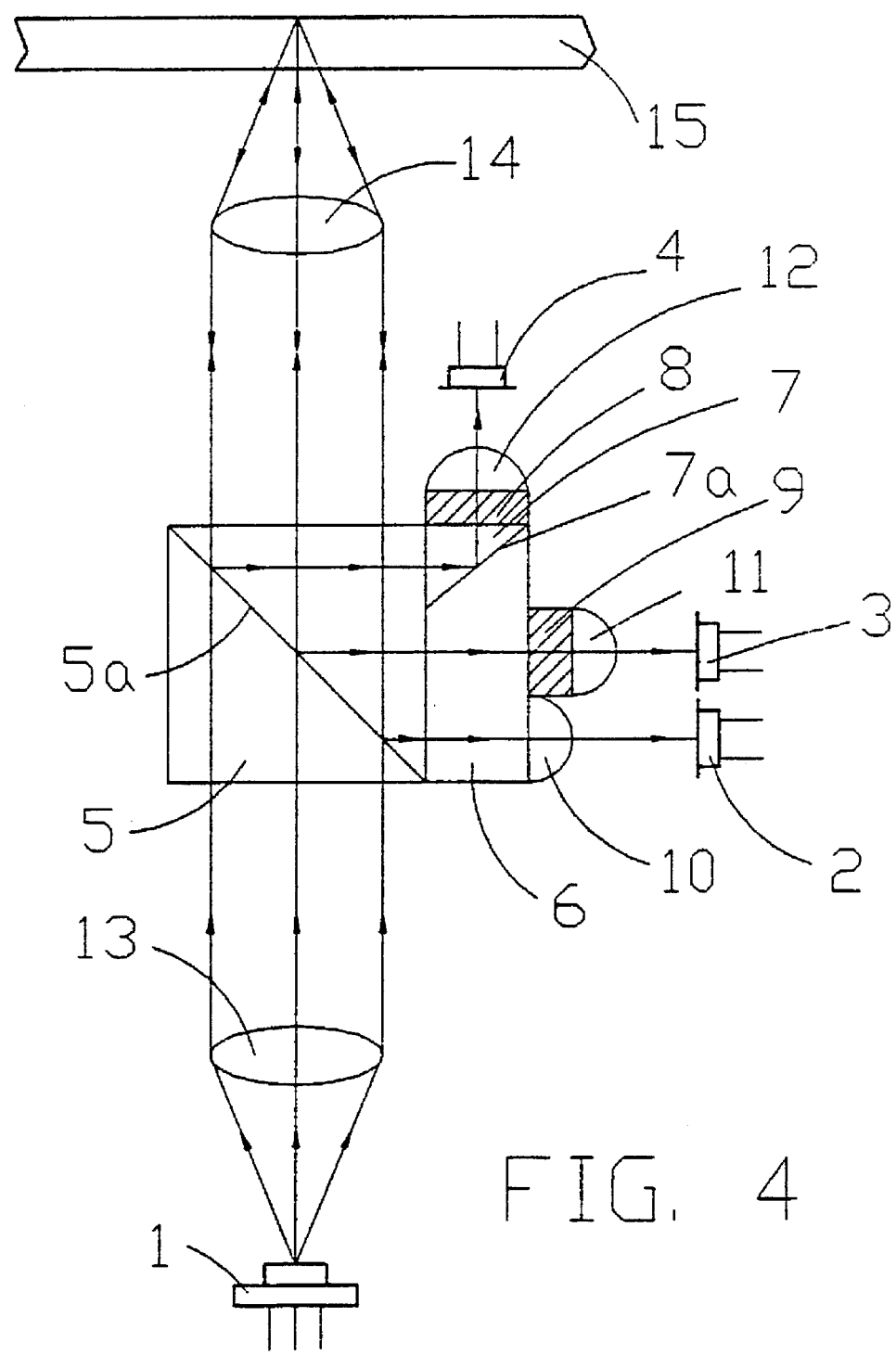
FIG. 4 shows the structure of an optical head for reading recorded digital information from an optical memory according to another embodiment of the invention.

FIG. 4 shows another embodiment of the present invention. Laser light emitted from the source 1, is collimated by the collimating lens 13 onto the cubical beam splitter 5. The cubical beam splitter 5, passes the light toward the focusing lens 14 which focuses the light onto the optical memory 15. Reflected light from the optical memory passes once again through the focusing lens 14 before being reflected by the interface 5a of the beam splitter 5. Instead of a cubical beam splitter 5, one may also use half-mirrored plate which is set at 45 degrees with respect to direction of light. Reflected light from the interface 5a enters the compensator 6 and quarter wave phase retartder 7. Quarter wave phase plate 7 is a prism similar to the one proposed by Lostis(Lostis, 1957, Journal de Phys. Rad. 18, page 51 S) for making a half wave plate. It is a three sided, 45 degrees right angle prism 7, upon the hypotenuse face of which, 7a, a thin film of higher index of refraction than of the prism 7 is deposited. Light is internally reflected at the hypotenuse face of the prism 7a, as well as totally internally reflected at the interface of prism 7 and the compensator 6. By controlling the thickness of the deposited thin film, a quarter-wave can be achieved which will perform superbly over conventional retarder plates which are hard to make, costly, and sensitive to the variation of the read-out wave length of the light. However, it must be also noted that if phase plate is used, then compensator 6 is unnecessary provided that the light enters the retarder perpendicular to the face of the phase plate.

The compensator 6, is made of exactly the same material as the retarder 7 and is cemented to the prism 7. It is a right-angle prism, with a right-angle trapezoid cross sectional area as shown in FIG. 4. Part of the rays reflected from the beam splitter 5 pass through the retarder 7. Optical path taken by the rest of the rays needs to be compensated against the path taken by the rays through the retarder 7. This path equalization is accomplished by the compensator 6. Light coming out of quarter wave retarder is incident upon the polarizer sheet 8, which has its axis of transmission set at 45 degrees. The light that passes through the polarizer 8 is focused by the detector lens 12 on the optical detector 4. The intensity of the light recorded by the photo detector is designated as $I_2$. The light that passes through the compensator 6, is divided into half. One part goes through the polarizer sheet 9 whose axis of transmission is set at 45 degrees before reaching the detector lens 11. This lens will focus the light on the photo detector 3 which records the light intensity $I_1$. The other half part of the light transmitted through the compensator 6 is focused by the detector lens 10 upon the photo detector 2. This detector records the light intensity $I_0$.

The polarizer could also be made by either reflection from or transmission through thin films of proper thickness deposited on a substrate; provided the resultant amplitude of the two orthogonal components of light emerging from such polarizer are equal, and compensator 6 thickness is adjusted for any extra optical path taken by the emergent ray of light.

In practice, if due to geometrical restrictions light can not be equally distributed in third among said phase retarder 7, polarizer 9, and detector lens 10, then appropriate constant factors (equal to the amount of light that each three said element receives) must be assigned in front of $I_2$, $I_1$, and $I_0$ in equation (8).

Equation (8) can be electronically (either by a table look-up or by a Cordic algorithm) carried out to detect the phase difference between the orthogonal electrical components of the light reflected from the optical memory.

Although, due to compactness, reliability and cost FIG. 4 shows that various optical elements 5 to 12 are cemented together, it is understood by one skilled in the art that they could be separated provided that the optical paths of rays are equal. The invention has been described with particular reference to certain preferred embodiments thereof, but it will be understood that variations and modifications can be effected within the spirit and scope of the invention.

I claim:

1. An optical head, whereby difference in phase of orthogonal electrical components of reflected light from an optical memory is used to detect recorded information on said memory, said phase difference is calculated in accordance with the equation $$\text{Tan}(\Delta\delta) = (I_2 - \tfrac{1}{2}I_0)/(I_1 - \tfrac{1}{2}I_0)$$

where $\Delta\delta$ is said phase difference and $I_2$, $I_1$, $I_0$ are intensities of light detected by three photo detectors 4, 3, and 2 as described in the followings; said optical head comprising:

a light emitting laser source 1 emitting linearly polarized light; and a collimating lens 13, as a means for generating a collimated beam of light emitted from said laser source 1; and a cubical beam splitter 5; and a phase retarder 7; and a compensator 6; and a polarizer 8 with its transmission axis set at 45 degrees; and a polarizer 9 with its transmission axis set at 45 degrees; and three detector lenses 10, 11, 12; and said three photo detectors 2, 3, and 4; and a focusing lens 14 as a means to focus light transmitted through said beam splitter 5 onto said optical memory;

said beam splitter 5 is placed between said collimating lens 13, and said focusing lens 14, and adjacent to said phase retarder 7 and said compensator 6, said cubical beam splitter 5 used as a means to transmit light output from said collimating lens 13 toward said optical memory, and to reflect light turned back by said memory toward said phase retarder 7 and said compensator 6;

said quarter wave phase retarder 7 consisting of a three sided 45 degrees right angle prism upon its hypotenuse face, a thin film, of higher index of refraction than of said prism 7, of sufficient thickness is deposited as a means to introduce a phase difference of 90 degrees in light emergent from said cubical beam splitter 5 and incident on said quarter wave retarder;

said quarter wave retarder 7 is placed next to said cubical beam splitter 5, and said compensator 6 having its said hypotenuse in a direction such that light reflected from said hypotenuse enters immediately said polarizer 8 upon exit from said quarter wave; said retarder 7 collects one third of light emerging from said beam splitter 5;

said compensator prism 6, being of same material as of said phase retarder 7 and having a right angle trapezoid as its cross section as a means to equalize the optical paths taken by the light traveling through said phase retarder 7 and the rest of the light emerging from said beam splitter; placed next to said cubical beam splitter 5 and said phase retarder 7 is said compensator 6 such that its bases are perpendicular to direction of light entering said compensator 6, and said compensator 6 collects two third of light emerging from said beam splitter 5;

said polarizer 8 is placed on light emerging face of said quarter wave phase retarder as a means to generate the light intensity $I_2$;

said detector lens 12 as a means to collect and to focus emergent light from said polarizer 8 onto said photo detector 4;

said polarizer 9 is placed next to said compensator 6 collecting half the light emergent from said compensator 6 as a means to generate the light intensity $I_1$;

said detector lens 11 as a means to collect and to focus emergent light from said polarizer 9 onto said photo detector 3;

said detector lens 10 as a means to collect the other half of the light not collected by said polarizer 9 and to focus this collected emergent light from said compensator 6 onto said photo detector 2 as $I_0$;

said three photo detectors 4, 3, and 2 as a means to convert the light intensities $I_2$, $I_1$, and $I_0$ into corresponding electrical signals for calculating said phase difference between electrical components of light reflected from said optical memory.

2. An optical head in accordance with claim 1, wherein said cubical beam splitter 5 is replaced with a half mirror plate set at 45 degrees angle with respect to the direction of light.

3. An optical head in accordance with claim 1, wherein said retarder 7 is a quarter-wave plate perpendicular to direction of the light entering said retarder, thereof said compensator 6 is eliminated.

4. An optical head in accordance with claim 1, wherein light reflected by said beam splitter 5 is not equally divided to reach said photo detectors 4, 3, and 2, hence the 3 said intensities $I_2$, $I_1, I_0$ will assume proportional constant factors when deriving said phase difference.

5. An optical head in accordance with claim 1, wherein polarizers are made of thin films of sufficient thickness deposited on a substrate such that emergent light from such polarizers having orthogonal electrical components of equal magnitude.

6. An optical head which uses difference in phase of orthogonal electrical components of reflected light from an optical memory to detect recorded information on said memory, whereby said phase difference is calculated in accordance with the equation $\text{Tan}\,(\Delta\delta)=(I_2-\tfrac{1}{2}I_0)/(I_1-\tfrac{1}{2}I_0)$, where $\Delta\delta$ is said phase difference and $I_2, I_1, I_0$ are intensities of light detected by three photo detectors 4, 3, and 2 as described in the followings, comprising:

a light emitting laser source 1 emitting linearly polarized light; and a collimating lens 13, as a means for generating a collimated beam of light emitted from said laser source 1; and three cubical beam splitters 5, 16, and 17; and two polarizers 8, and 9; and a quarter wave phase retarder 7; and three detector lenses 10, 11, and 12; and said three photo detectors 2, 3, and 4; and a focusing lens 14 as a means to focus light transmitted through said beam splitter 5 onto said optical memory;

said cubical beam splitter 5, situated between said collimating lens 13 and focusing lens 14, as a means to allow the output light from said collimating lens to pass through entirely toward said optical memory while reflecting light which is reflected back from said optical memory in orthogonal direction to said collimating lens output light;

said cubical beam splitter 16 as a means to split the reflected output light from said beam splitter 5 toward beam splitter 17, as well as toward said quarter-wave phase retarder 7;

said cubical beam splitter 17 as a means to split the transmitted light through said beam splitter 16 toward said detector lens 10, as well as toward said polarizer 9;

said quarter wave phase retarder 7, having axis in parallel with the transmission axis of said polarizer 8 is placed before said polarizer 8, said retarder is used as a means to introduce 90 degrees phase difference in light incident upon said retarder from said cubical beam splitter 16;

a polarizer 8 having its transmission axis set at 45 degrees and receiving input light from said quarter wave phase retarder 7, said polarizer 8 is used as a means to produce the light intensity $I_2$;

said detector lens 12 as a means to collect and focus the emergent light from said polarizer 8 upon a photo detector 4;

said polarizer 9 having transmission axis set at 45 degrees, and receiving input light from reflected light from beam splitter 17, said polarizer 9 is used as a means to produce light intensity $I_1$;

said detector lens 11 as a means to focus the light emergent from said polarizer 9 upon photo detector 3;

said detector lens 10 as a means to focus the light transmitted through beam splitter 17 upon photo detector 2, said detector lens 10 is used as a means to produce light intensity $I_0$;

said three photo detectors 4, 3, and 2 as a means to convert the light intensities $I_2$, $I_1$, and $I_0$ into corresponding electrical signals for calculating said phase difference between orthogonal electrical components of light reflected from said optical memory.

7. An optical head in accordance with claim 6, wherein polarizers are made of thin films of sufficient thickness deposited on a substrate such that emergent light from such polarizers having orthogonal electrical components of equal magnitude.

8. An optical head in accordance with claim 6, wherein any or all said cubical beam splitter 5, 16, and 17 is replaced with a half mirror plate set at 45 degrees angle with respect to the direction of light.

* * * * *